US007484391B1

(12) United States Patent
Moore

(10) Patent No.: US 7,484,391 B1
(45) Date of Patent: Feb. 3, 2009

(54) DOOR LOCK SYSTEM FOR TRAILERS AND CARGO CONTAINERS

(76) Inventor: Gregory B. Moore, 340 Poplar Dr., Buchanan, TN (US) 38222-4961

( * ) Notice: Subject to any disclaimer, the term of this patent is extended or adjusted under 35 U.S.C. 154(b) by 184 days.

(21) Appl. No.: 11/155,456

(22) Filed: Jun. 18, 2005

Related U.S. Application Data

(63) Continuation-in-part of application No. 10/671,187, filed on Sep. 24, 2003, now abandoned.

(51) Int. Cl.
*E05B 47/00* (2006.01)
(52) U.S. Cl. .............................. 70/257; 70/92; 70/140; 70/280; 70/432; 70/465; 292/21; 292/92; 292/144; 292/155; 292/DIG. 65
(58) Field of Classification Search ............... 70/257, 70/92, 465, 280–282, 277, 278.1, 278.7, 70/DIG. 12, 432–434, 140; 292/21, 92, DIG. 53, 292/DIG. 54, DIG. 64, DIG. 65, 144, 155
See application file for complete search history.

(56) References Cited

U.S. PATENT DOCUMENTS

| 1,676,059 | A | * | 7/1928 | Smith ........................... 292/92 |
| 1,804,387 | A | * | 5/1931 | Dorsey et al. ................. 70/240 |
| 2,785,916 | A | * | 3/1957 | Mutti ........................... 292/144 |
| 3,425,742 | A | * | 2/1969 | Rauber, Jr. .................. 296/121 |
| 3,427,835 | A | * | 2/1969 | Jeffee .......................... 70/432 |
| 3,624,761 | A | | 11/1971 | Kohn ........................... 180/289 |
| 3,767,240 | A | * | 10/1973 | Belanger ..................... 292/144 |
| 3,829,834 | A | * | 8/1974 | Frankland et al. ........... 340/543 |
| 3,950,018 | A | | 4/1976 | Pickering .................... 292/144 |
| 4,083,424 | A | | 4/1978 | von den Stemmen ....... 180/289 |
| 4,095,372 | A | * | 6/1978 | Rittner ......................... 49/460 |
| 4,466,643 | A | * | 8/1984 | Godec et al. ................. 292/92 |
| 4,509,347 | A | * | 4/1985 | Young .......................... 70/129 |
| 4,685,709 | A | * | 8/1987 | Kambic ....................... 292/201 |
| 4,691,542 | A | | 9/1987 | Young .......................... 70/129 |
| 4,799,719 | A | * | 1/1989 | Wood .......................... 292/144 |
| 4,866,963 | A | | 9/1989 | Leininger et al. .......... 70/278.2 |
| 4,904,005 | A | * | 2/1990 | Frolov ...................... 292/251.5 |
| 5,042,852 | A | * | 8/1991 | Vitt et al. ..................... 292/21 |
| 5,245,652 | A | * | 9/1993 | Larson et al. .......... 379/102.06 |
| 5,532,521 | A | | 7/1996 | Leininger .................. 307/10.2 |
| 5,546,777 | A | * | 8/1996 | Liu et al. ...................... 70/257 |
| 5,867,941 | A | * | 2/1999 | Gurzenda et al. ............. 49/460 |
| 5,934,023 | A | * | 8/1999 | Gurzenda et al. ............. 49/460 |
| 6,050,116 | A | * | 4/2000 | Cole ............................ 70/256 |

(Continued)

*Primary Examiner*—Lloyd A Gall
(74) *Attorney, Agent, or Firm*—Lee W. Tower

(57) ABSTRACT

A door lock system for enclosures is provided which includes a screw drive mechanism releasably mounted on a back plate member and coupled via threads to a threaded locking member to linearly drive the locking member to engage with a receptor on an enclosure frame to lock the enclosure. A controller unit has an integrated circuit configured to control the operation of the screw drive mechanism and report the status of the door to a central location. A position switch is used to indicate whether the door is open or closed so that the controller unit can automatically engage the screw drive mechanism to lock the door after a preset time delay. A keypad allows a user to enter a code to unlock the door. A radio in the controller unit permits wireless communication to report status and to allow central command control over the doors.

12 Claims, 11 Drawing Sheets

U.S. PATENT DOCUMENTS 6,318,138 B1 * 11/2001 Mathews et al. ........... 70/278.7
7,059,159 B2 * 6/2006 Lanigan et al. ................ 70/280
2003/0156010 A1 * 8/2003 Roeland .................... 340/5.73

* cited by examiner

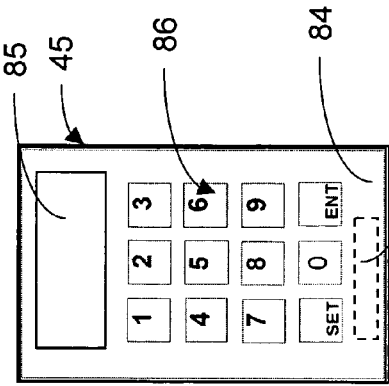
FIG. 6
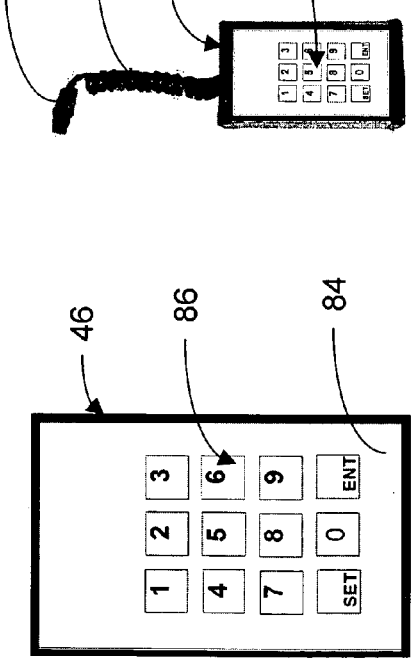
FIG. 5
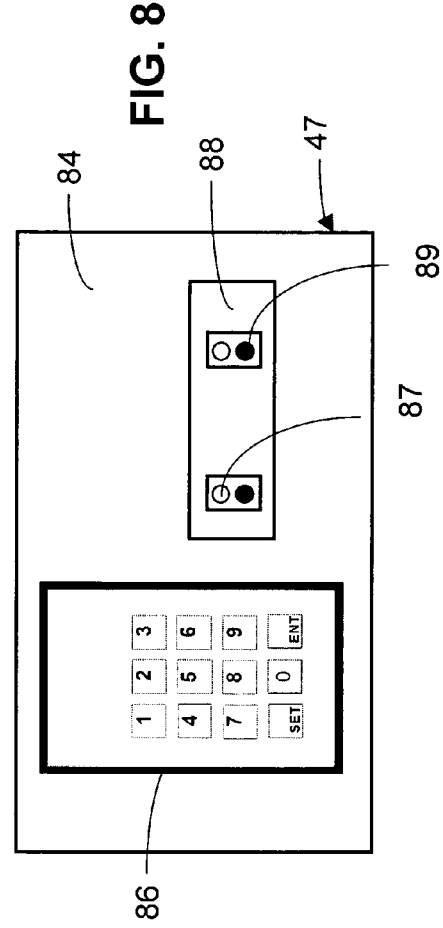
FIG. 7
FIG. 8

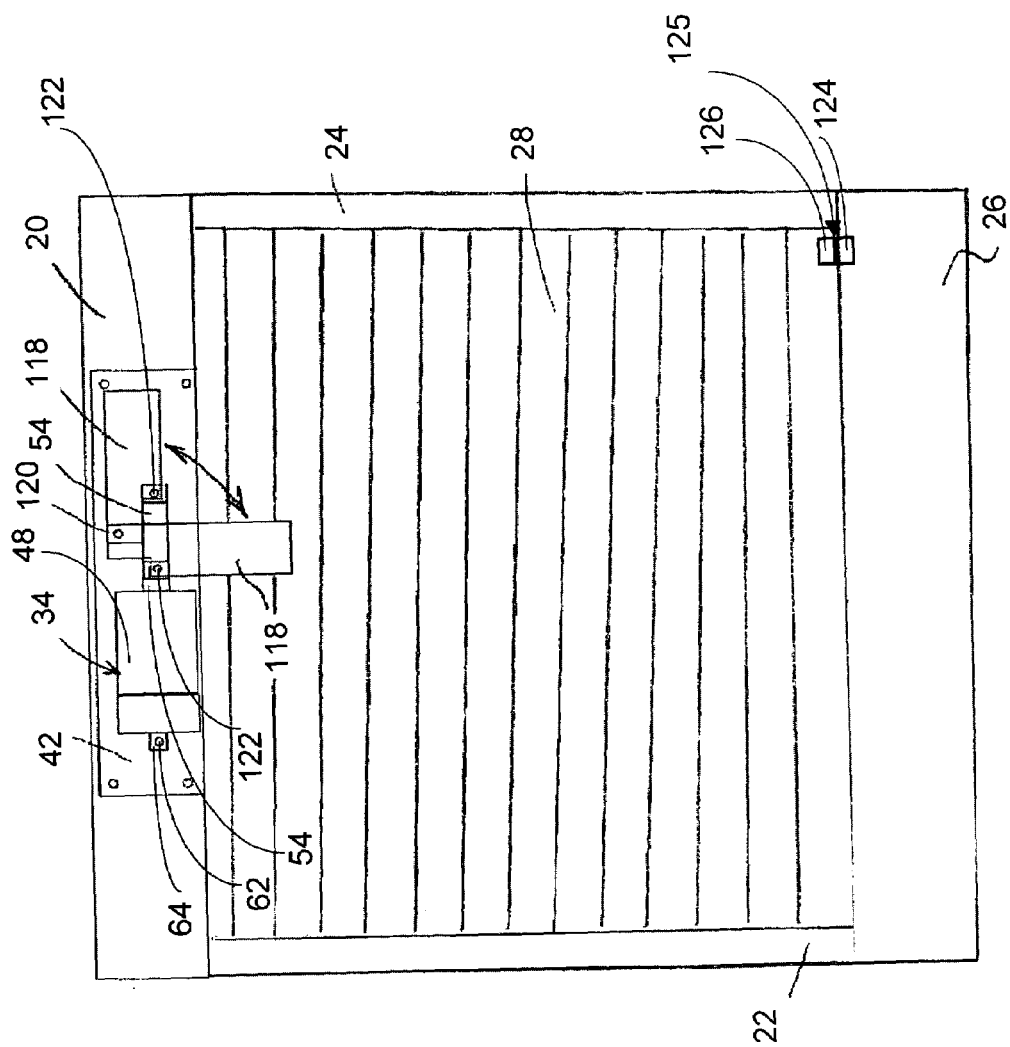

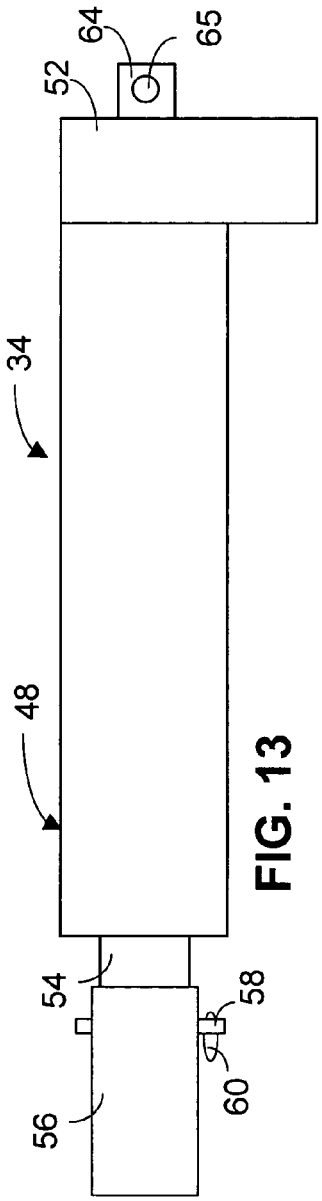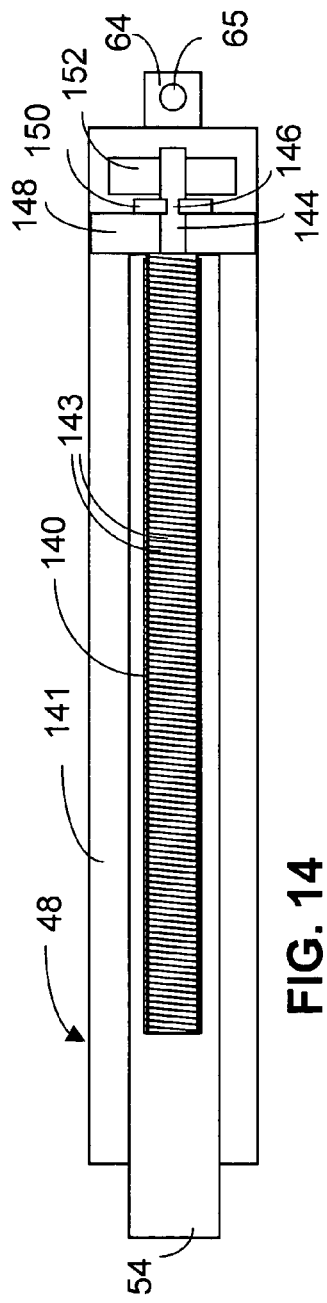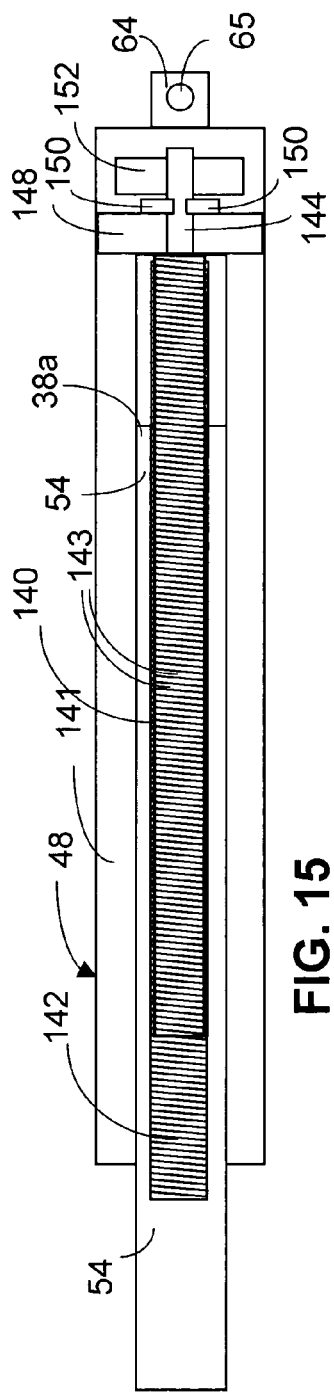

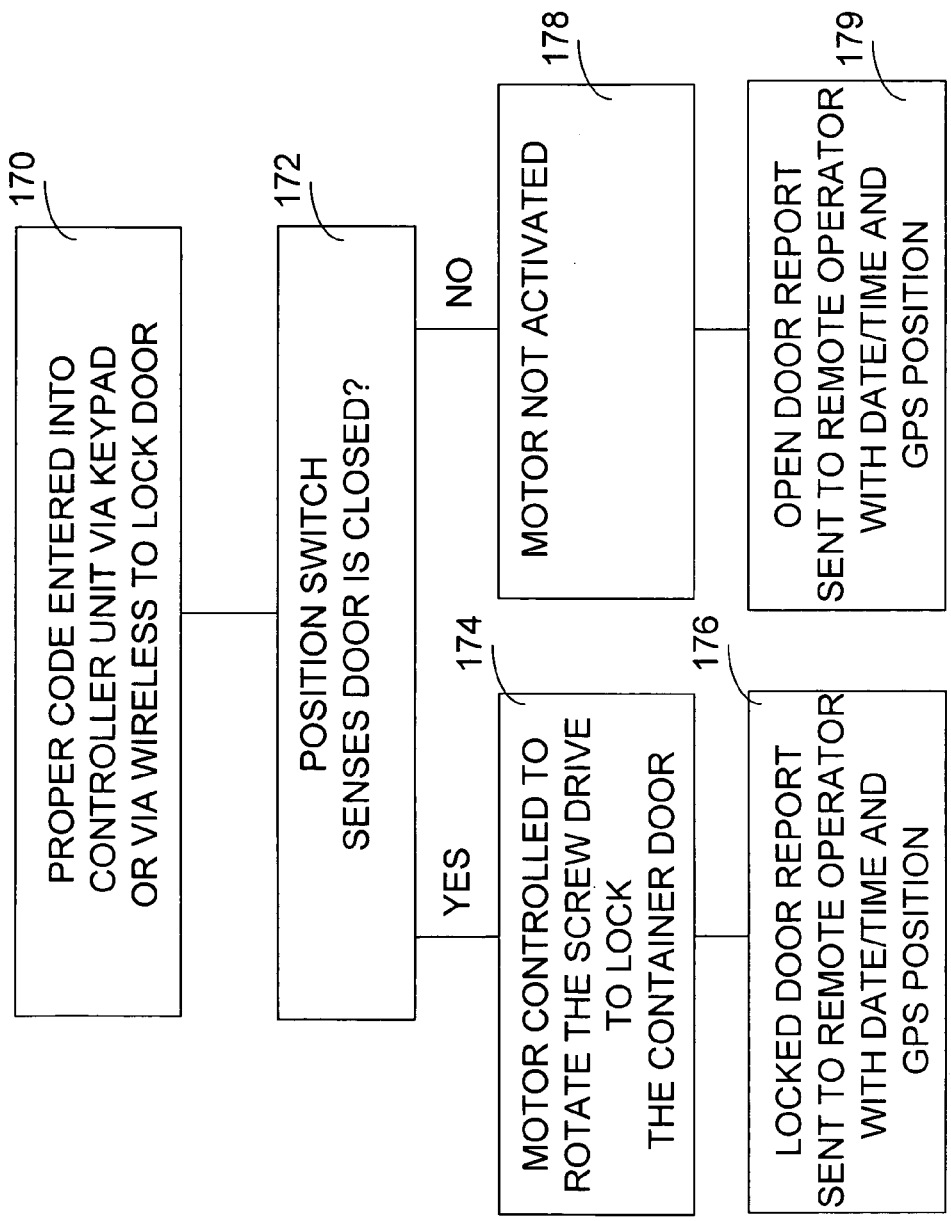

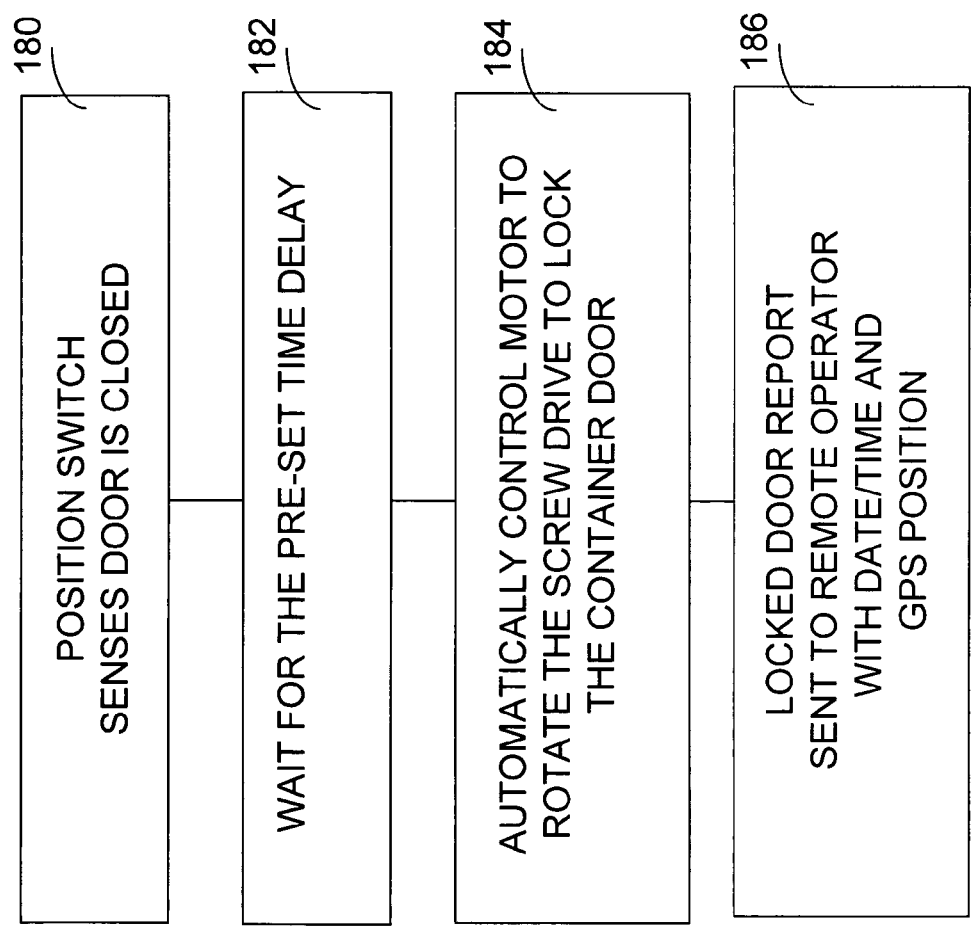

DOOR LOCK SYSTEM FOR TRAILERS AND CARGO CONTAINERS

CROSS-REFERENCE TO RELATED APPLICATION

This is a continuation-in-part of abandoned patent application Ser. No. 10/671,187 filed Sep. 24, 2003 now abandoned, the subject matter of which is incorporated herein by this reference, as though set forth in full.

BACKGROUND OF THE INVENTION

1. Field of the Invention

The field of the present invention relates generally to computer-controlled lock devices for securing the doors of a trailer or cargo container so as to prevent unauthorized entry into the trailer or container.

2. Description of the Related Art

Many persons utilize trailers and cargo containers for various applications, including trailers and containers that are used to transport goods, vehicles, and other materials. Although the trailers and containers commonly used in the trucking and cargo industry are very expensive, the goods being transported therein, such as electronics or cars, can often far exceed the value of the trailer or container itself. While pulling a trailer or cargo container carrier, the truck driver often needs to leave the trailer or container unmanned at a specified location. In fact, cargo containers are often utilized as storage containers that are left at the same location for extended periods of time. All too often, unfortunately, thieves utilize the opportunity of a trailer or cargo container left alone, particularly if it is at a remote location, to steal the contents of the trailer or container. Once the thieves open the trailer or container doors, they will quickly remove its contents and leave the area. Due to the nature of the crime and the goods stored therein, it is often difficult for the owner of the goods to regain possession of his or her property.

In addition to carrying or storing general consumer goods, trailers and cargo containers are utilized all over the world to carry and/or store materials that are known to be desirable to terrorists, both domestic and foreign, and other individuals or groups that desire to harm others or acquire their property. These materials include explosive devices, chemicals, weapons, ammunition, parts for repairing weapons and materials for making or using explosives and weapons. Although some of this material is transported or stored under guarded conditions, much of it is not. Because of greater concern for national security and safety throughout the world, numerous governments, military, private companies and individuals are taking a more active role in addressing or regulating the security of trailers and cargo containers. Even trailers or containers carrying or storing items once thought to be relatively benign, such as those transporting or storing food goods, are now facing increased security concerns and regulations due to the realization that such items can be easily and effectively contaminated with chemical or biological matter than could harm large numbers of people.

In light of the increased security risks and governmental oversight, unauthorized entry into and theft from trailers is a major concern among those in the trucking and cargo container industry. As security devices become more complicated and more expensive, thieves become more sophisticated and more resourceful, making protection of an unmanned trailer or container very difficult and expensive. Devices have been developed that, when regularly and properly used, generally deter the would be thief from stealing a vehicle, such as an automobile or truck, in part because of the amount of time and effort it takes to remove or get around the theft deterrent device. An example of devices that have been generally successful at reducing theft of vehicles are the various steering wheel lock devices that provide a bar across the steering wheel, making movement of the steering wheel, and hence the vehicle, virtually impossible. While the steering wheel lock devices have worked well, there exists a need for a device that prevents entry into a trailer or cargo container in order to protect the owner's investment in the goods stored therein and to prevent sensitive materials falling into the possession of dangerous individuals or groups.

To prevent the theft of materials from inside a trailer or cargo container left or stored at protected or unprotected locations, trailer and container owners typically use exterior mechanical locking devices, such as padlocks and the like, and seals that are designed to physically prevent entry into the trailer or container. As those in the trucking industry know, experience has proven that the devices currently in use can be overcome relatively easily by the determined and resourceful thief, particularly one with a good set of bolt cutters. In addition to being relatively easy to overcome, the devices are useless if the truck driver or container operator (i.e., a person having authority to open the container to remove the contents or conduct an inventory check) forgets to set the locks. Even when the driver or operator does set the lock or locks, problems can arise if the next authorized driver or operator does not have the correct key or combination and is forced to break the lock to gain entry into the trailer or container, thereby rendering the security system useless. In areas where a number of people may need access to the contents of a trailer or container, the ability to ensure that the right person has the necessary key or combination to gain entry into the trailer or container can be quite challenging.

In order to be able to find a stolen truck and hopefully find the goods or materials carried therein, some trucking companies utilize satellite tracking devices attached to the truck and/or trailer that enable the trucking company or law enforcement personnel to track the movement of the truck/trailer. Although the theft of cargo containers is relatively less common, it is possible to load them onto a truck or other vehicle. As such, some satellite systems are also configured to work with cargo containers. Unfortunately, most satellite systems are very expensive and can be relatively easily disabled (i.e., with a screwdriver and hammer) due to the vulnerability of the antenna assembly.

Although the various theft deterrent devices currently available have some ability to prevent theft of materials from inside a trailer or cargo container, they have disadvantages and limitations that prevent wide acceptance or effective theft deterrence. One of the most common problems with presently available trailer or container security devices is the need to rely on human operation to set or re-set the security device. What is needed, is an easy to use and effective theft deterrent or locking device that allows a trailer or container owner to quickly and securely lock the trailer or container door in order to prevent unauthorized entry into the trailer or container.

SUMMARY OF THE INVENTION

The door lock for trailers and cargo containers of the present invention solves the problems identified above, and provides a new and useful locking device that effectively prevents unauthorized entry through a trailer or container door. The door lock device of the present invention is adaptable to new and existing trailers and containers, is easy for the truck driver or container operator to engage and is difficult for the thief to overcome or disable. The door lock of the present invention automatically engages the locking system when the door is closed and maintains the lock in the locked condition until an authorized person enters the proper unlock code.

Accordingly, the primary objective of the present invention is to provide a door lock for trailers and cargo containers that provides the advantages described herein and overcomes the disadvantages and/or limitations associated with presently available door lock devices and systems.

It is also an important objective of the present invention to provide a door lock for trailers and cargo containers that is useful for both trailers and cargo containers with or without their own source of power and for the swing and roll-up types of doors.

It is also an important objective of the present invention to provide an easy to use and effective theft deterrent system that is difficult to overcome so as to prevent theft of materials from a trailer or cargo container.

It is also an important objective of the present invention to provide a door lock for trailers and cargo containers that is adaptable for new and retrofit installations at various locations on the doors of the trailer or cargo container.

It is also an important objective of the present invention to provide a door lock device for trailers and cargo containers that will maintain a commanded locked or unlocked condition even if power and control are removed from the door lock device.

It is also an important objective of the present invention to provide a door lock device for trailers and cargo containers that allows for escape for a person inadvertently locked inside of a cargo container.

The above and other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 5 is a front view of a keypad configured to operate with the door lock system in accordance with the present invention;

FIG. 6 is a front view of the keypad configured to be separate from the trailer and removably connectable with the door lock system when used to operate the controller unit in accordance with the present invention;

FIG. 7 is a front view of the keypad with a display and computer componentry in accordance with the present invention;

FIG. 8 is a front view of the keypad with a visual representation of the locked and unlocked doors in accordance with the present invention;

FIG. 12 is a front view of the door locking component of the door lock system configured for use with a roll-up door from inside a trailer or cargo container having the roll-up door closed in accordance with the present invention.

FIG. 13 is a detailed view of the actuator mechanism showing the screw drive mechanism, rod, collar, gear box and the extension on the actuator mechanism in accordance with the present invention;

FIG. 14 is a sectional view of the screw drive mechanism showing the threaded screw drive and the rod threaded onto the screw drive in accordance with the present invention;

FIG. 15 is a another sectional view of the screw drive mechanism showing the threaded screw drive and the rod threaded onto the screw drive with the rod extended by the screw drive in accordance with the present invention;

FIG. 18 shows the steps for a method of locking a door and reporting the locked status of the door or reporting that the door is open to a remote operator in accordance with the present invention;

FIG. 19 shows the steps for a method of automatically locking a door upon sensing the position of the door is closed and sending a locked door report to a remote operator in accordance with the present invention;

DETAILED DESCRIPTION

With reference to the figures where like elements have been given like numerical designations to facilitate the reader's understanding of the present invention, and particularly with reference to the embodiments of the present invention illustrated in the figures, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
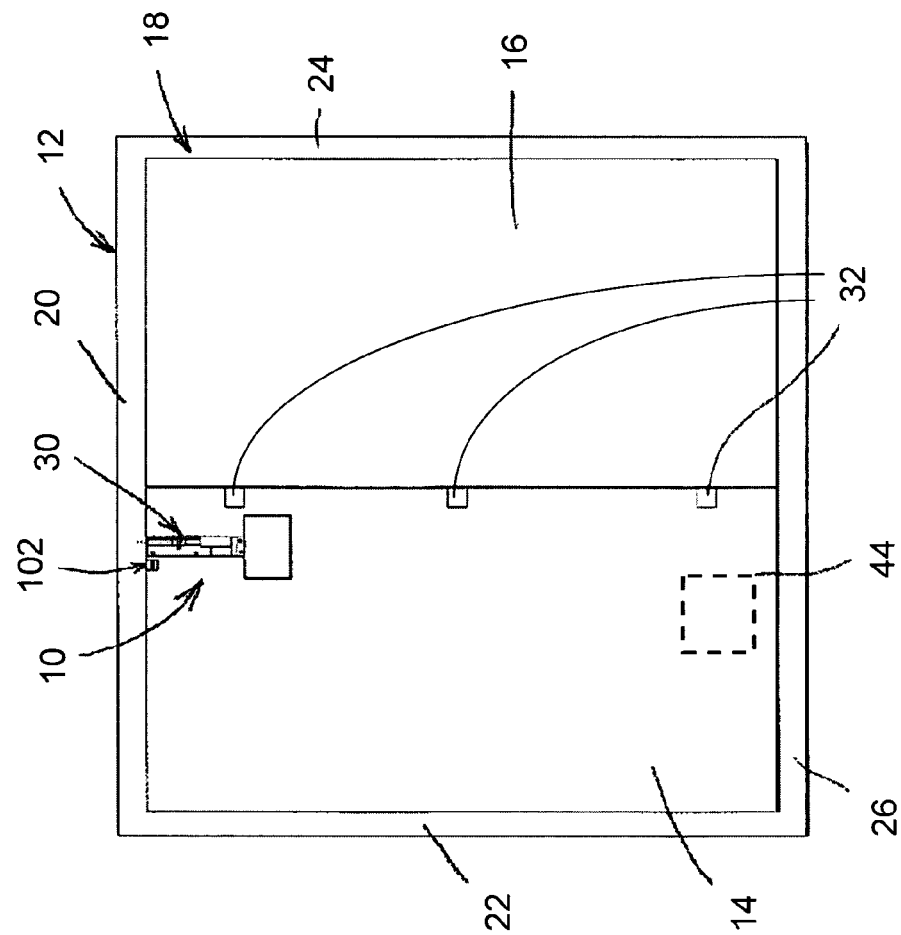
FIG. 1 is a front view of the door locking component of the door lock system from inside a trailer or cargo container with the swing doors closed in accordance with the present invention.

Referring now to drawings, FIG. 1 shows a door lock system 10, which is configured to function with any enclosure, the definition of which is intended in this application to be all inclusive, including doors on trailers, containers, cargo containers, storage containers, delivery trucks, delivery vans public storage facilities, garages, homes and all other types of enclosures that have a door.

In FIG. 1, the door lock system is shown on a trailer 12 used for hauling freight. The trailer 12 is representative of other enclosures and the door lock system, as described above, can operative equivalently on any enclosure. Trailers 12 are often used to ship goods on ship freighters and truck trailers. Such trailers 12 are commonly utilized in the trucking and storage industries to move and store numerous types of materials, including consumer goods and sensitive or dangerous materials. There are many different types of trailers 12 in use, many of which are configured to meet or exceed International Standards Organization (ISO) trailer/container requirements or other regulations pertaining to domestic trailer and/or cargo container configurations. In one configuration, trailers 12 have a pair of swing-type loading doors 14 and 16 mounted on a structural frame 18 having a plurality of frame members, including top member or header 20 supported by side members 22 and 24 above bottom member or threshold 26. A trailer or cargo container 12 can also be configured with a single roll-up door 28 that is rolled or slid upward at an opening of trailer 12, as shown in FIG. 12.

FIG. 1 shows the view from inside trailer 12 with doors 14 and 16 closed. The door locking component 30 of door lock system 10 can be mounted on the inside of the trailer on door 14 near header 20 to operatively engage header 20 for locking the trailer. Alternatively, door locking component 30 can be mounted on door 14 at or near threshold 26 to operatively engage threshold 26 to lock the trailer. In either configuration, door locking component 30 should be mounted generally near the center of header 20 or threshold 26 where doors 14 and 16 meet, as shown in FIG. 1. As shown, after door 16 is closed, door 14 closes to abut against the overlap plates 32 on door 16. Therefore once door 14 is closed and locked to the trailer by door locking component 30, door 16 is locked as well. As shown in FIG. 12, door locking component has a different configuration to prevent unauthorized entry into trailer 12 having roll-up door 28. In either configuration, as explained in more detail below, door lock system 10 is utilized with trailer 12 to prevent unauthorized entry into the interior storage compartment of trailer 12 through doors 14 and 16 or roll-up door 28.

Figure 2:
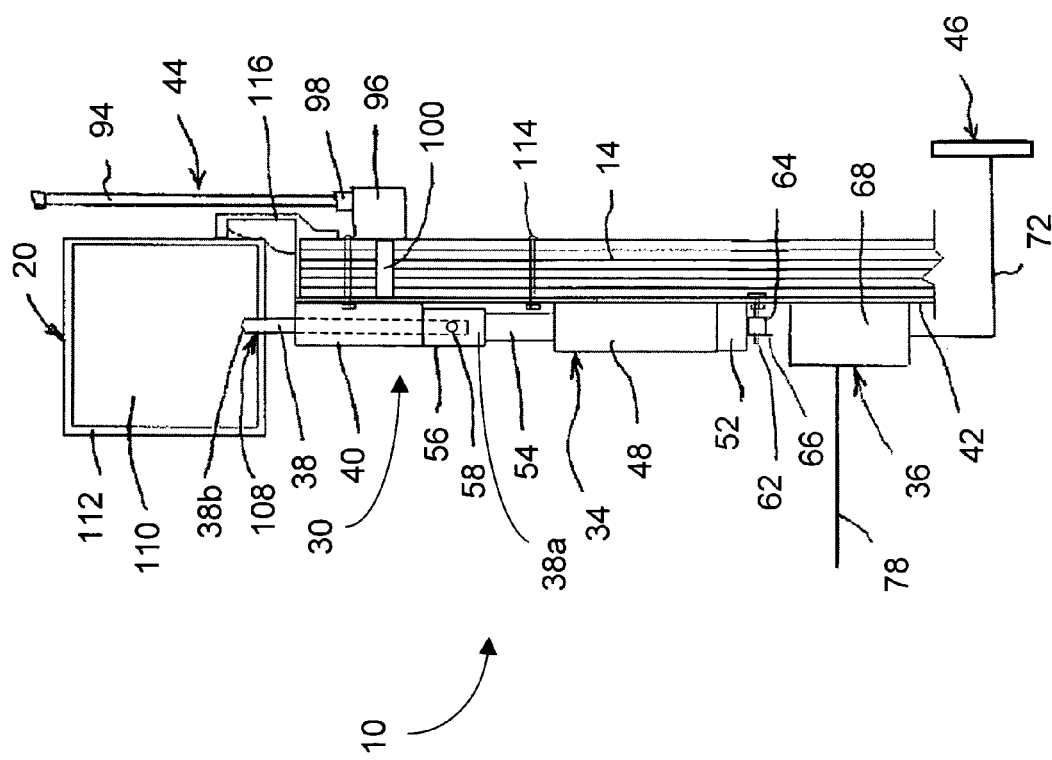
FIG. 2 is a side view of the door locking system engaging a door frame header in accordance with the present invention.

FIG. 2 is a side view of the door locking system 10 engaging a doorframe header 20, showing detail of the door locking component 30. The door locking component includes an actuator mechanism 34 controlled by computerized controller unit 36. The actuator mechanism 34 is connected to sliding bolt 38, which is slidably disposed in tubular member 40. The actuator mechanism 34 is releasably attached to the back plate member 42. The controller unit 36 is attached to back plate member 42, as shown in FIG. 2. As set forth in more detail below, controller unit 36 can be operatively connected to antenna system 44 for wireless communication for receiving commands and reporting status. A keypad 46 also can be used for entering command codes into controller unit 36 to engage or disengage door lock system 10, as shown generally in FIG. 2.

Figure 3:
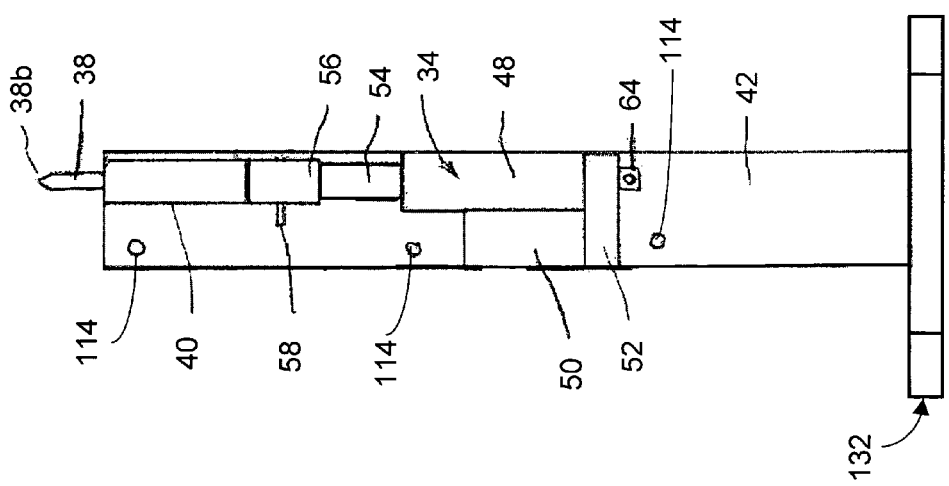
FIG. 3 is a front view of the door locking mechanism and its related components mounted on the back plate member in accordance with the present invention.

As shown in FIGS. 2 and 3, the actuator mechanism 34 is an electro-mechanical mechanism having a motor 50, a gear box 52, and screw drive mechanism 48. The motor 50 drives the gears in the gear box 52 which drives the screw drive mechanism 48. The screw drive mechanism 48 has many advantages and solves long standing problems compared to other systems that have been used in the past for locking trailers, which include hydraulic, pneumatic and solenoid-based systems. A key advantage is that once the screw drive mechanism 48 driven by motor 50 drives sliding bolt 38 to a particular position, the sliding bolt 38 will stay in that position until the motor 50 again drives the screw drive mechanism 48. If power and control to rotate the screw drive mechanism 48 in one direction or the other is not supplied, then the screw drive mechanism 48 and hence the sliding bolt 38 will stay in the position last attained. Prior art hydraulic, pneumatic and solenoid-based lock systems all depend on power being present to supply pressure to the hydraulic or pneumatic system, or electricity to operate the solenoid in order to keep the lock in the desired position.

The screw drive mechanism 48 is releasably attached to rod 54, sliding bolt 38, and collar 56 by first pin 58. First pin 58 is placed through holes in sliding bolt 38, rod 54 and collar 56 to couple these components together such that the movement of rod 54 by screw drive mechanism 48 will cause sliding bolt 38 to move linearly inside tubular member 40 along its longitudinal axis. Tubular member 40 is welded or otherwise attached to back plate member 42. The sliding bolt 38 and the inside of tubular member 40 are adapted to allow the sliding bolt 38 to slide within the tubular member, but not to twist inside the tubular member 40. By preventing twisting the tubular member 40 cooperates with the screw drive mechanism to provide linear motion of the sliding bolt relative to the tubular member 40 when the screw drive mechanism is driven by motor 50, under control of controller unit 36.

Figure 4:
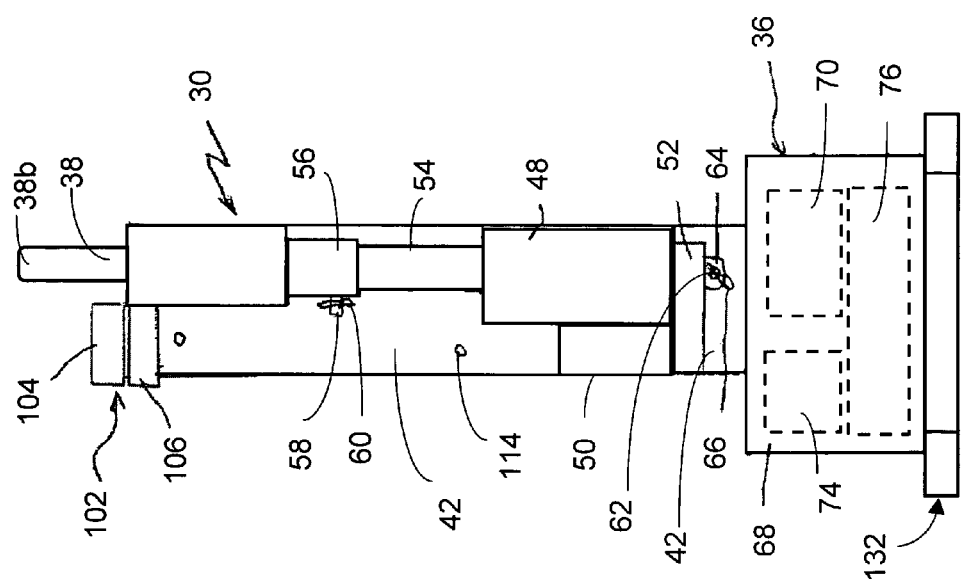
FIG. 4 is a front view of the door locking system, controller unit and position switches of the door lock system in accordance with the present invention.

First pin 58 cooperates with first spring clip 60, best shown in FIG. 4, to releasably maintain first pin 58 engaged with rod 54, sliding bolt 38 and collar 56. Second pin 62, shown in FIGS. 2 and 4, projects outwardly from a fixed position on back plate member 42, engages a hole 65, shown in FIG. 13, in base extension 64, which is attached to screw drive mechanism 48, to releasably hold the screw drive mechanism 48 and thereby actuator mechanism 34 in place on back plate member 42, as best shown in FIGS. 2 and 3. Second spring clip 66, best shown in FIG. 4, is utilized to releasably maintain the coupling of second pin 62 with base extension 64. As more fully explained below, together the first pin 58 and the second pin 62 provide a way for someone inadvertently locked inside a trailer to disassemble sufficiently the door lock system in order to escape the trailer.

A person inadvertently locked inside trailer 12 would first remove second spring clip 66 from second pin 62, as shown in FIG. 4, and pull actuator mechanism 34 at extension 64 away from back plate member 42 and off of second pin 62, shown in FIG. 2. The person then would remove first spring clip 60 from first pin 58, as shown in FIG. 4, and uncouple first pin 58 from rod 54, sliding bolt 38 and collar 56. Actuator mechanism 34 could then be lowered to move second end 38*b* of sliding bolt 38 from engagement with header 20. To facilitate this operation, first spring clip 60 and second spring clip 66 can be of the quick-release type commonly utilized in various connecting operations.

As best shown in FIGS. 2 and 4, controller unit 36 is mounted to the front side of back plate member 42. Controller unit 36 has a housing 68 that encloses appropriate computer circuitry and componentry, shown as integrated circuit board 70 on FIG. 4, for controller unit 36 to read and analyze incoming signals from various components of door lock system 10 so as to operate actuator mechanism 34 to lock or unlock door lock system 10. Preferably, housing 68 seals and encloses the components inside controller unit 36 to prevent intrusion of water or other fluids that could damage the computer circuitry and componentry on integrated circuit board 70. Controller unit 36 is in communication with keypad 46 such that operation of keypad 46 can control the locking and unlocking by door locking component 30. As shown in FIG. 2, keypad 46 connects to controller unit 36 by keypad wire 72. Other known mechanisms of connecting keypad 46 to controller unit 36 can be utilized. Controller unit 36 can also enclose a radio or other wireless communication device 74, as shown in FIG. 4, to permit wireless radio communication with a remote central office (i.e., via cell tower or satellite connection) or even to a hand-held radio device placed near trailer 12. The wireless communication device 74 can be a 900 MHz, 32 bit encryption radio or a cell phone or other such device. A rechargeable battery 76 can also be located inside controller unit 36, preferably in a sealed compartment so it cannot damage the other components, and operatively connected to the electrical system of trailer 12, by battery wire 78, as shown in FIG. 2. This allows recharging of battery 76 by the electrical system of trailer 12 or a vehicle pulling trailer 12. If a battery 76 is not used, then controller unit 36 can be typically the same width as back plate member 42. As shown in FIGS. 1 and 4, housing 68 will generally need to be somewhat wider if a battery 76 is housed therein. Generally, cargo containers or like containers lack an electrical system or other mechanism for recharging battery 76. However, solar panels or similar devices can be used to create a recharging system to allow use of battery 76 in door lock system 10 when used with cargo containers and the like. Since cargo containers are placed on the deck of ships during shipment and stored outside at harbors, there is ample opportunity to for a solar cell to recharge battery 76.

Electronic keypad 46, which is shown in detail in FIG. 5, can be placed on the exterior of trailer 12 to allow authorized persons to lock or unlock door lock system 10 to open doors 14 and 16. Keypad 46 connects to controller unit 36 via keypad wire 72, shown in FIG. 2, and can be located on door 14, as shown in FIG. 1, or other places at the rear of trailer 12. Alternatively, keypad 46 can be placed at the front end of trailer 12. This location may be particularly beneficial if door lock system 10 is used in conjunction with a brake lock system for preventing unauthorized movement of trailer 12. Keypad 46 comprises a keypad case 84 having a plurality of keys 86, such as the numeric and command keys shown in FIG. 5, sufficient for secure operation of controller unit 36. Keypad 46 can be securely mounted to trailer 12 to prevent keypad 46 falling off during transit or being easily removed by unauthorized persons.

As shown in FIG. 6, the keypad 46 can also be a portable device that has cord 90 with connector 92 at the end thereof that is adapted to connect to a like-configured port (not shown) on trailer 12. In this configuration, the keypad case 84 can also enclose a battery (not shown) to operate actuator mechanism 34. This embodiment is particularly useful when door lock system 10 is utilized with a cargo container that does not have its own electrical system or is not connected to another electrical system so as to recharge battery 76 inside controller unit 36.

In yet another embodiment, as shown in FIG. 7, keypad 45 can include separate computer componentry 83 to allow it to store and analyze data and a display panel 85 to display that information. For instance, such a keypad 45 can be utilized for inventory purposes. Every time someone opens doors 14 and 16 to add material in trailer 12 or remove material from trailer 12, he or she can enter the amount of material (i.e., ammunition or explosive devices) being removed from trailer 12. In this manner, the inventory of material inside trailer 12 will be known, particularly to persons remote from trailer 12, which can be accomplished by transmitting such information via a wireless network.

A visual keypad 47 can also be provided and includes function keys 86, as well as, visual representation 88 of the locked/unlocked status of the various doors on trailer 12, as shown in FIG. 8. Different colored lights can be utilized to visually signal locked and unlocked conditions of the various doors. For example, light 87 if lit green would indicate that door number 1 is locked. Similarly light 89 if lit red would indicate that door number 2 is unlocked. This could be particularly important when trailer 12 is utilized to transport different types (i.e., frozen, refrigerated and dry goods) of food materials. Once loaded into different compartments that are securely separated inside trailer 12, governmental regulations prohibit more than one door being open at any given time to avoid contamination of the food materials. Failure to abide by these regulations can result in significant fines and the intended recipient refusing to take the food materials. The visual keypad 47 of FIG. 8 lets the user know at a glance which, if any, doors are unlocked. If placed at the front end of trailer 12, the visual keypad 47 of FIG. 8 could be placed so that it can be seen in the driver's rearview mirror while trailer 12 is in transit. The visual keypad on a cargo container would also instantly indicate the cargo container door locked and unlocked conditions.

Antenna system 44, shown in FIG. 2, is used to improve the reception for wireless communication device 74 located inside housing 68 of controller unit 36 so that door lock system 10 can be controlled or monitored remotely, for example from company headquarters. In the embodiment shown in FIG. 2, antenna system 44 comprises antenna rod 94 mounted on mounting box 96 by antenna adapter 98. The components for antenna system 44 should be selected to operatively correspond to wireless communication device 74. For instance, if wireless communication device 74 is a 900 MHz radio, then antenna system 44 should be a 900 MHz antenna so as to provide optimum performance for radio 74. To utilize antenna system 44, a hole 100 should be drilled or otherwise provided in door 14 to allow an antenna wire (not shown) to pass from antenna rod 94 to wireless communication device 74 in controller unit 36. Antenna system 44 can be of the type that communicates with a GPS tracking unit located in the cab of a truck utilized to haul trailer 12. Instead of utilizing antenna rod 94 and the other external components, antenna system 44 can be configured to be internal to keypad 46 and included in the keypad wire 72 that connects to controller unit 36. In one configuration, antenna system 44 is a loop antenna disposed inside keypad 46 or, if signal strength is not a problem, inside controller unit 36 itself.

The door lock system 10 includes a position switch 102, as shown in FIGS. 1 and 4, which is coupled to the integrated circuit board 70 in controller unit 36 to indicate the open or closed position of door 14. A variety of position switches 102 may be employed for communicating the position of door 14 to the integrated circuit board 70 of controller unit 36. As explained in more detail below, door lock system 10 utilizes information pertaining to the position of door 14 to operate actuator mechanism 34 so as to operatively engage sliding bolt 38 with header 20. Position switch 102, as shown in FIG. 4, can be a reed switch having a first magnet 104 mounted to frame 18, such as to header 20 or threshold 26 as the case may be, and a second magnet 106 mounted to door locking component 30, such as on back plate member 42, so as to swing open and close with door locking component 30 as door 14 is opened or closed. As is well known in the art, a magnetic field between magnets 104 and 106 is employed to open and close connections to circuits on integrated circuit board 70. Other types of proximity types of switches can be used to determine the opened or closed position of door 14, including various traditional contact mechanisms. Although position switch 102 can be located on or near door locking component 30, position switch 102 could be located away from door locking component 30 (i.e., at threshold 26 if door locking component 30 at header 20, or vice-versa).

Back plate member 42 is made out of steel or other durable and strong material. Housing 68 for controller unit 36 can be bolted, welded or otherwise attached to back plate member 42. Second pin 62 can extend from the back side of back plate member 42 through back plate member 42 to extend frontwardly, as shown in FIG. 2. As stated above, actuator mechanism 34 is releasably attached to second pin 62. Tubular member 40 can made from a steel tubular material and machine welded or otherwise fixed to back plate member 42. In one configuration, sliding bolt 38 is a ¾" stainless steel bolt and tubular member 40 has an inside diameter of ⅞" to allow sliding bolt 38 to be slidably disposed therein and to move without substantial interference from tubular member 40. To prevent door 14 from being opened, sliding bolt 38 is configured to engage a receptor 108 in or mounted to header 20 or threshold 26. As shown in FIG. 2, receptor 108 is a hole drilled or otherwise provided in header 20 that is sized and configured to slidably receive sliding bolt 38 inside chamber 110 of the tubular frame 112 of header 20, which can be a 4" by 4" square tubular member. In one configuration, the top of door locking component 30 is positioned approximately one inch below the bottom of header 20, by mounting back plate member 42 to door 14. The screw drive mechanism and sliding bolt 38 are configured to provide a linear travel distance for the sliding bolt 38 of approximately two inches. Thus when locked, approximately one inch of second end 38b of sliding bolt 38 is received inside chamber 110 of tubular frame 112 of header 20 (or threshold 26). If desired, depending on the desired amount of security necessary, the amount of sliding bolt 38 received inside chamber 110 can be increased or decreased. Back plate member 42 can be mounted to door 14 using a plurality of bolts, such as carriage bolts 114, that pass through door 14 and back plate member 42, as shown in FIG. 2. As known to those skilled in the art, a variety of other connection mechanisms and devices are also suitable for connecting back plate member 42 to door 14. Upper bracket 116, currently utilized by most trailers 12, prevents external access to sliding bolt 38.

In operation with door locking component 30, position switch 102, keypad 46 and antenna system 44 mounted in place, the locked position, as shown in FIG. 2, has second end 38b of sliding bolt 38 disposed through receptor 108 inside chamber 110 of tubular frame 112 of header 20. As such, door 14, and consequently door 16, cannot be opened. In order to open doors 14 and 16, an authorized person enters the appropriate code on keypad 46 or visual keypad 47 to cause controller unit 36 to operate actuator mechanism 34 to cause rod 54 to move downward. Because of the connection at collar 56, sliding bolt 38 is also moved downward such that second end 38b thereof is no longer engaged in or through receptor 108 into chamber 110. Once sliding bolt 38 is free of header 20, doors 14 and 16 may be swung open.

Integrated circuit board 70 can include or be connected to a timer that will automatically operate actuator mechanism 34 after a preselected amount of time to move sliding bolt 38 upward into engagement with receptor 108 in header 20. This feature is particularly useful if someone unlocks door lock system 10 but is called away or otherwise does not open door 14 within the preset time period. To prevent sliding bolt 38 moving upward when door 14 is open, integrated circuit 70 will only move sliding bolt 38 into the locking engagement if position switch 102 indicates that door 14 is closed. If position switch 102 indicates door 14 is closed and the preset time on the timer expires, then integrated circuit board 70 of controller unit 36 will send a command to actuator mechanism 34 to move sliding bolt 38 into engagement with receptor 108 at or in header 20. If door 14 is open, as indicated by position switch 102, integrated circuit board 70 will not send a command to moves sliding bolt 38. As soon thereafter that position switch 102 indicates to controller unit 36 that door 14 is closed, integrated circuit 70 will send the command to move sliding bolt 38 to engage it in receptor 108 in header 20. In this manner, controller unit 36 will automatically engage door lock system 10 to lock door 14, thereby eliminating the need for the driver or operator to remember to engage door lock system 10 after closing door 14. This will eliminate unlocked doors 14 and 16 caused by human error due to forgetting to lock doors 14 and 16. In addition to being used to automatically lock or prevent locking of door 14, position switch 102 is utilized to report the status, open or closed, of door 14 to a remote operator or to a remote controller, which could itself be automated.

When used with wireless communications, door lock system 10 can be controlled to locked or unlocked door 14 remotely. By communicating the status of position switch 102 to a remote controller or operator, the remote operator can determine whether the door is open or closed. The integrated circuit board 70 also knows whether the door lock system is in a locked condition (actuator mechanism 34 has fully extended sliding bolt 38) or unlocked condition (actuator mechanism 34 has retracted sliding bolt 38). By combining the status reported wirelessly from position switch 102 and the status reported on the actuator mechanism 34 lock/unlock condition, a remote operator can determine whether in fact door 14 is closed and locked.

Information pertaining to the opening and closing of door 14 can be stored inside controller unit 36 and/or sent over a wireless network to a remote controller or operator, including transmissions on a real time basis. In this manner, oversight of access to the interior of trailer 12 can be maintained, thereby reducing the likelihood of unauthorized access to the contents inside trailer 12 by "insider" persons who otherwise have the codes and authority to operate keypad 46. This should significantly reduce the likelihood of employee or related party theft of materials from trailer 12. When used with GPS and like systems, a central command center will be able to determine if a trailer 12 is where it is supposed to be and if someone is accessing the materials stored therein. Depending on the materials being transported or stored in trailer 12, immediate action can be taken to prevent the unauthorized removal or theft of the material.

The door lock system 10 of the present invention allows the person exercising control over the contents of trailer 12 to prevent anyone, including the driver, from opening door 14 by limiting access to the correct code. Keypad 46 can also be configured to receive code changes, by utilizing appropriate security level clearances, that would modify the existing code to unlock the system 10 if it were believed the security code had been compromised or if trailer 12 was being sent to a different receiving party than was originally intended (as a result, requiring a different code for the new receiving party).

Another feature is to provide a clock with the date and time of day on integrated circuit board 70. Each time the doors are unlocked or locked, this clock can be read and stored for later access or in real time sent to a remote controller or operator. This allows the owner of the trailer or container to know when the container was opened. If the container is opened when the owner does not expect it to be unlocked, then it may indicate to the owner that an "insider" with access to the correct code is misusing access to the codes for nefarious purposes. If this is the case the owner can remotely change the codes to prevent further access and question the "insider".

As discussed above, the door lock system 10 of the present invention can be configured to interact with a satellite or cellular telephone system and a GLS/GPS system such that it will transmit a signal if door 14 is opened without the proper code being entered and identify the location of trailer 12.

The door lock system 10 can be configured to work with a brake lock system to prevent unauthorized movement of trailer 12. When door lock system 10 is used in conjunction with a brake lock system, a would-be thief is prevented from moving trailer 12 from its designated location. This makes theft of materials from inside trailer 12 much more difficult on the thief when he or she cannot easily open the container doors due to door lock system 10. As is well known, time is generally one of the primary means of discouraging a thief. If the thief is bold enough to attempt to break into trailer 12 where it sits, door lock system 10 will make this difficult and, if it happens, will transmit a signal indicating an unauthorized entry into trailer 12 to a remote controller, remote operator or police station.

In addition to the above discussed safety feature regarding persons inadvertently locked inside of trailer 12, which could be caused by a strong wind blowing door 14 accidentally closed, door lock system 10 is configured to prevent a broken or missing position switch 102 from causing door 14 to be stuck in a locked condition. Integrated circuit 70 is configured such that information from position switch 102 is not required to send a command to actuator mechanism 34 to disengage sliding bolt 38 from receptor 108 to open door 14. An open command can be sent at any time from controller unit 36. As such, if position switch 102 becomes damaged during loading or unloading materials into or from trailer 12 or if it breaks during transit, the driver, operator or other authorized person can still open door 14 by entering the correct code at keypad 46. If position switch 102 is damaged, door lock system 10 could still be locked with a special code that would command locking even if the position switch does not indicate that the door is closed. This mode only works if an operator is present and knows the door is closed.

Various modifications to the door lock system 10 are possible. For instance, instead of having second end 38b of sliding bolt 38 engage a hole in header 20 or threshold 26, a separate receptor 108 can be mounted on or attached to header 20 or threshold 26. The hole drilled into header 20 or threshold 26 is preferred because it does not interfere with the ingress and egress of materials from trailer 12 and is significantly less likely to be damaged than a separate component.

Figure 9:
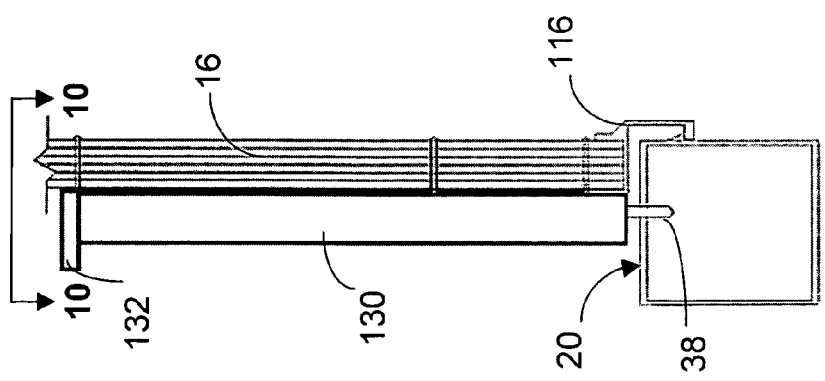
FIG. 9 is a side view of the door locking system engaging a door frame threshold with a cover installed on the door locking system in accordance with the present invention.

FIG. 9 is a side view of the door locking system 10 engaging a door frame threshold 26 with a cover 130 installed over all of the actuator mechanism 34 and the controller unit 36 to prevent dirt, dust and other debris or fluids from contacting the covered components. Depending on the environmental conditions in which trailer 12 is or will be utilized, the cover 130 may greatly increase the lifetime of the door locking system 10.

Figure 11:
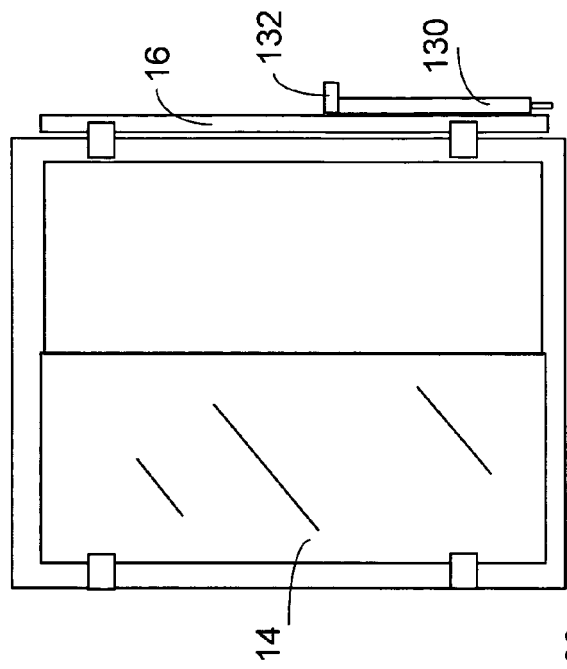
FIG. 11 is an outside view of the back of a trailer or cargo container showing one door open and swung against the outside of the trailer and protected by the protruding bumper in accordance with the present invention.
Figure 10:
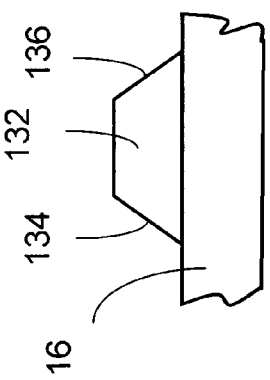
FIG. 10 is top view of the door locking system along line 10-10 of FIG. 9 showing a protruding bumper in accordance with the present invention.

Bumper 132, shown in FIG. 9, is an integral part of the door locking system 10 and can be attached to cover 130, as shown in FIG. 9, or to back plate member 42, as shown in FIG. 3. The purpose of bumper 132 is to prevent physical damage to the door locking system 10. FIG. 10 is top view of the door locking system along line 10-10 of FIG. 9 showing the bumper 132 protruding beyond the cover 130. The bumper can prevent items inside the trailer or cargo container from damaging the door locking system 10. The bumper can also prevent damage when trailers 12 or cargo containers are stacked in proximity to one another. FIG. 11 is an outside view of the back of a trailer 12 or cargo container showing door 16 open and swung against the outside of the trailer 12. If another trailer or cargo container is then stacked immediately adjacent to the swung open door 16, then bumper 132 will ward off potential damage to the door lock system 10. If a cargo container is being positioned against an open cargo container door, then angular facets 134 and 136, as shown in FIG. 10, will deflect the invading cargo container to help ensure that the door lock system 10 will remain operational.

In another embodiment, shown in FIG. 12, instead of moving sliding bolt 38 along a straight linear path into receptor 108, actuator mechanism 34 is utilized to pivot tongue 118 so as to block the roll-up path of roll-up door 28. As shown in FIG. 12, which is a view from inside trailer 12, the linear movement of rod 54 acts on tongue 118 so as to pivot it around pivot connector 120. Tongue 118 is shaped and configured to pivotally react when rod 54 is extended outward or drawn into screw drive mechanism 48 of actuator mechanism 34. As shown, back plate member 42 is mounted to the inside wall of header 20 such that tongue 118 is pivoted from a down position that blocks the movement of roll-up door 28 to an up position along back plate 42 and header 20 that allows roll-up door 28 to be rolled along the tracks inside trailer 12. With tongue 118 facing downward in the down position any upward movement of roll-up door 28 is prevented, thereby keeping roll-up door 28 in a closed position. The remaining components for door lock system 10 of this embodiment can be the same as described above for swing doors 14 and 16. Position sensor 125 and magnets 124 and 126 operate in the same manner as described above for position sensor 102 and magnets 104 and 106, and are used to sense whether the roll-up door is open or closed. The actuator mechanism 34 is releasably attached to the back plate member 42 by pin 62 through extension 64 on actuator mechanism 34. By removing a spring clip 66 (not shown in FIG. 12), a person trapped inside a locked container can move the actuator mechanism such that the tongue 118 is moved sufficiently to allow the opening of roll-up door 28.

FIG. 13 is a detailed view of the actuator mechanism 34 showing the screw drive mechanism 48, rod 54, collar 56, gear box 52 and the extension 64 with hole 65 for second pin 62. Also shown are first pin 58 and first spring clip 60. The operation of the screw drive mechanism can be better understood by reference to FIGS. 14 and 15, which are sectional views of the screw drive mechanism 48. As shown the screw drive 140 has threads 143. The rod 54 has threads 142 internal to the rod that are threaded onto the threads 143 on screw drive 140. The screw drive 140 is connected to a screw drive rod 144, which can be an extension of the screw drive 140. The screw drive rod 144 and the screw drive 140 are held in place in the screw drive mechanism 48 by ring 148 and retainer 150, which is placed around a notch 146 in the screw drive rod 144. The retainer 150 is attached to tube 141. A gear 152 is mounted onto the screw drive rod 144, and is driven by gears within gear box 52, which are driven by motor 50, as described above.

When gear 152 is driven to rotate threaded screw drive 140 counterclockwise, then rod 54 is driven by threads 142 in contact with threads 143 to extend further beyond tube 141, as shown in FIG. 15. When gear 152 is driven to rotate screw drive 140 clockwise, then rod 54 is driven by threads 142 in contact with threads 143 to retract into tube 141, as shown in FIG. 14. When rod 54 is extended then the door locking system 10 is put into a locked condition, and when rod 54 is retracted, then the door locking system 10 is put into an unlocked condition. This mechanism applies to either the container doors as shown in FIG. 1 or the roll-up container door shown in FIG. 12.

Figure 16:
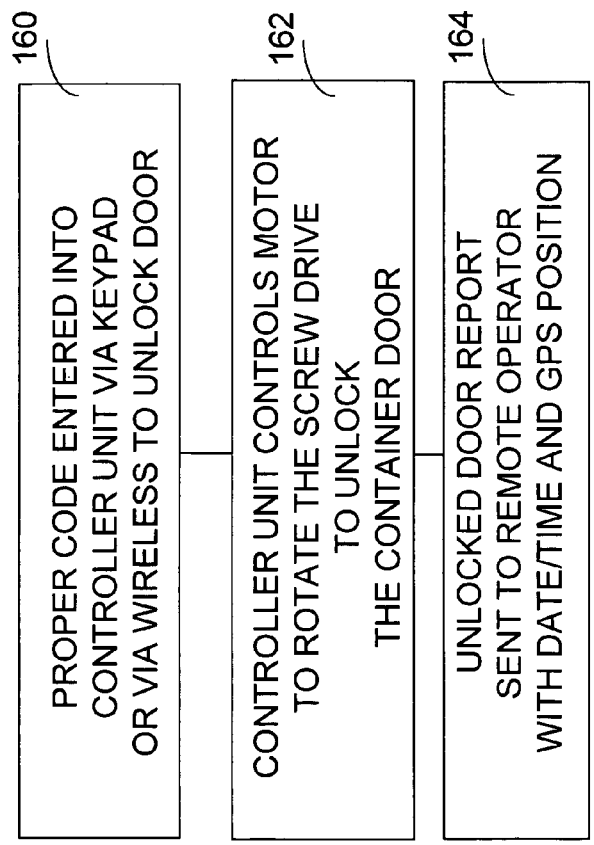
FIG. 16 shows the steps for a method of unlocking the door in accordance with the present invention.

FIG. 16 shows the steps for a method of unlocking the door. In step 160, a proper code is entered into controller unit 36 via keypad 46 or via wireless to unlock the door locking system 10. Then in step 162, the controller unit 36 controls motor 50 to rotate the screw drive 140 to unlock the door locking system 10, thereby unlocking the container door 14. Finally in step 164, an unlocked door report is sent via wireless communication device 74 to a remote operator.

Figure 17:
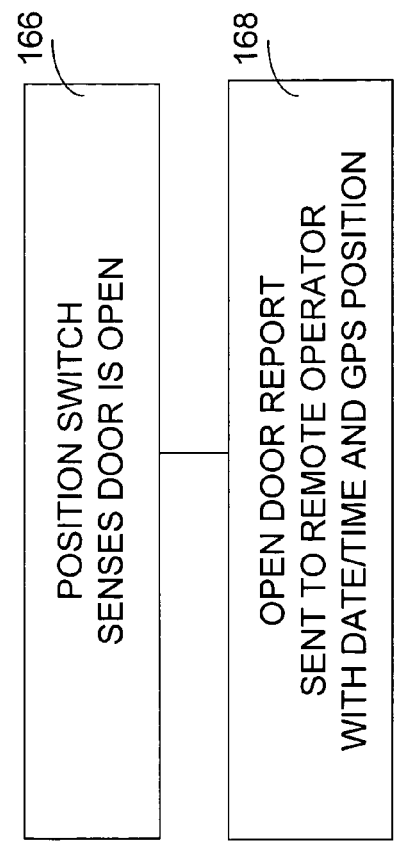
FIG. 17 shows the steps for a method of sensing a door is open and reporting the open door to a remote operator in accordance with the present invention.

FIG. 17 shows the steps for a method of sensing a door is open and reporting the open door to a remote operator. In step 166 the position switch 102 senses that a door is open. Then in step 168 an open door report is sent to a remote operator via wireless communication device 74. This allows the operator then to decide whether other action is required.

FIG. 18 shows the steps for a method of locking a door and reporting the locked or unlocked status of the door. In step 170 a proper code is entered into controller unit 36 via keypad 46 or via wireless to lock a door. Then in step 172 it is determined whether position switch 102 senses that the door is closed. If so, then in step 174 motor 50 is controlled to rotate screw drive 140 to lock the container door. Then in step 176, a locked door report is sent to a remote operator via wireless communication device 74. If in step 172 it is determined that position switch 102 does not sense that the door is closed, then the motor 50 is not activated (step 178) and in step 179 an open door report is sent to the remote operator.

FIG. 19 shows the steps for a method of automatically locking a door upon sensing the position of the door is closed. In step 180 the position switch 102 senses that a door is closed. Then in step 182 the system waits for the pre-set time delay. Then after the time delay, in step 184 the controller unit 36 automatically controls motor 50 to rotate screw drive 140 to lock the container door. Then in step 186 a locked door report is sent to a remote operator via wireless communication device 74.

Of course, the remote operator can take many different actions upon receiving these reports. In any event the reports can be recorded and referred to later if anything goes amiss.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope of the present invention and additional fields in which the present invention would be of significant utility.

For instance, it should be noted that the present invention is subject to modification with regard to the dimensional relationships set forth herein and modifications in assembly, materials, size, shape and use. For example, while a certain computer, electronic and radio devices and materials have been used in the embodiments of the invention set forth above, other such devices and materials could also be used.

It is therefore intended by the appended claims to cover any and all such applications, modifications and embodiments within the scope of the present invention.

What is claimed is:

1. A door lock system for an enclosure, said door lock system comprising:
    an enclosure door;
    a back plate member mounted on an interior surface of said enclosure door;
    a motor mounted on said back plate member;
    a door locking apparatus;
    a first pin coupled to said back plate member on a first end of said first pin and a second end of said first pin extending through said door locking apparatus;
    a first releasable clip coupled to said second end of said first pin to releasably hold said door locking apparatus on said first pin;
    wherein said door locking apparatus comprises:
        a screw drive having first threads, said screw drive coupled to said motor; and
        a locking member having a first end and a second end, said first end of said locking member adapted to prevent the opening of said door when said door lock system is in a locked position; and
        second threads on said second end of said locking member coupled to said first threads on said screw drive;
    a second pin extending through said locking member to couple said first end of said locking member to said screw drive; and
    a second releasable clip coupled to said second pin to releasably maintain said coupling between said locking member and said screw drive; and
    a controller unit in communication with said motor, said controller unit having computer circuitry configured to selectively control said motor to rotate said screw drive in a first direction to lock said enclosure door and to rotate said screw drive in a direction opposite to said first direction to unlock said enclosure door.

2. The door lock system of claim 1 wherein said first end of said locking member is adapted to be slidably coupled to a frame on said enclosure for said enclosure door; and wherein when said locking member is coupled to said frame, said enclosure door is locked.

3. The door lock system of claim 1 further comprising:
    a bumper for warding off damage to said door lock system, said bumper coupled to said back plate member and extending orthogonal to said locking member; and
    wherein said bumper comprises at least one angular portion for deflecting an invading object from said door lock system.

4. The door lock system of claim 1 further comprising a keypad coupled to said controller unit, said keypad adapted for entering commands to said controller unit.

5. The door lock system of claim 4 wherein:
    said keypad is adapted to be removably connectable to said controller unit; and
    said keypad comprises:
    a power source for operating said door lock system;
    computer circuitry for storing and analyzing status data from said controller unit; and
    a display for displaying entered commands and said data.

6. The door lock system of claim 1 further comprising at least one visual display coupled to said controller unit and mounted external to said enclosure for indicating whether an enclosure door is locked or unlocked.

7. The door lock system of claim 1 wherein said controller unit further comprises:
    means for wirelessly receiving commands to lock or unlock said enclosure door; and
    means for wirelessly sending status data of said enclosure door;
    wherein said status data comprises first information indicating whether said enclosure door is opened or closed, second information indicating whether said enclosure door is locked or unlocked, third information of a day and time, and fourth information of a location of said door lock system.

8. The door lock system of claim 1 wherein said controller unit further comprises:
    means for sensing said enclosure door is closed;
    a time delay counter for timing a first delay after sensing said enclosure door is closed; and
    means for automatically causing said motor to rotate said screw drive in said first direction after said first delay to automatically lock said enclosure door.

9. The door lock system of claim 1 wherein said controller unit further comprises:

means for receiving a code for unlocking said enclosure door;

means for determining if said received code is valid; and means for automatically controlling said motor to rotate said screw drive in a direction opposite the first direction to unlock said enclosure door.

10. The door lock system of claim 1 wherein said controller unit further comprises:

means for wirelessly sending status data;

wherein said status data comprises first information indicating whether said enclosure door is opened or closed, second information indicating whether said enclosure door is locked or unlocked, third information of a day and time, and fourth information of a location of said door lock system.

11. The door lock system of claim 10 wherein said controller unit further comprises:

means for automatically reading a day and time on a clock and including said day and time in said status data; and means for automatically reading a GPS location and including said GPS location in said status data.

12. The door lock system of claim 1 wherein said controller unit further comprises:

means for sensing said enclosure door is unlocked; and means for wirelessly sending a report that said enclosure door is unlocked.

\* \* \* \* \*